United States Patent [19]

Youn

[11] Patent Number: 5,507,072
[45] Date of Patent: Apr. 16, 1996

[54] HINGE SECUREMENT DEVICE FOR A PORTABLE COMPUTER

[75] Inventor: Jae-Sam Youn, Kyungki, Rep. of Korea

[73] Assignee: Samsung Electronics Co., Ltd., Suwon, Rep. of Korea

[21] Appl. No.: 344,660

[22] Filed: Nov. 22, 1994

[30] Foreign Application Priority Data

Nov. 29, 1993 [KR]  Rep. of Korea .................. 93-25490 U

[51] Int. Cl.⁶ ..................................................... E05D 7/10
[52] U.S. Cl. ................................ 16/261; 16/270; 16/272; 403/294; 403/316
[58] Field of Search .................................... 403/294, 315, 403/316, 294, 91, 92, 93; 16/251, 260, 261, 270, 272, 382, 387, 386

[56] References Cited

U.S. PATENT DOCUMENTS

| | | | |
|---|---|---|---|
| 2,172,027 | 9/1939 | Mashak | 16/270 |
| 5,052,078 | 10/1991 | Hosoi | 16/297 |
| 5,077,551 | 12/1991 | Saitou . | |
| 5,165,145 | 11/1992 | Sherman | 16/341 |
| 5,168,429 | 12/1992 | Hosoi . | |
| 5,264,992 | 11/1993 | Hogdahl et al. | 403/93 |
| 5,361,455 | 11/1994 | Kiefer | 16/272 |
| 5,394,297 | 2/1995 | Toedter | 16/386 |
| 5,439,309 | 8/1985 | Taz | 403/316 |

FOREIGN PATENT DOCUMENTS 1136003  12/1968  United Kingdom ..................... 16/270

*Primary Examiner*—W. Donald Bray
*Attorney, Agent, or Firm*—Cushman Darby & Cushman

[57] ABSTRACT

A hinge securement device for hingably securing the LCD support member and the main body of a portable computer. The hinge securement device includes a pair of hinges provided adjacent to opposite sides of a lower, front portion of an LCD support member, a pair of flat bars provided on respective ones of the hinges and extending outwardly therefrom, a pair of rails provided adjacent to opposite corners of the main body, each of the rails being provided with a slot or notch formed therein. The flat bars are preferably snap-fit into respective ones of the notches, to thereby couple the hinges to the main body. A pair of cap members are slidably secured to respective ones of the rails in at least partially covering relationship to the respective flat bars, to thereby secure the hinges to the main body of the portable computer.

27 Claims, 1 Drawing Sheet

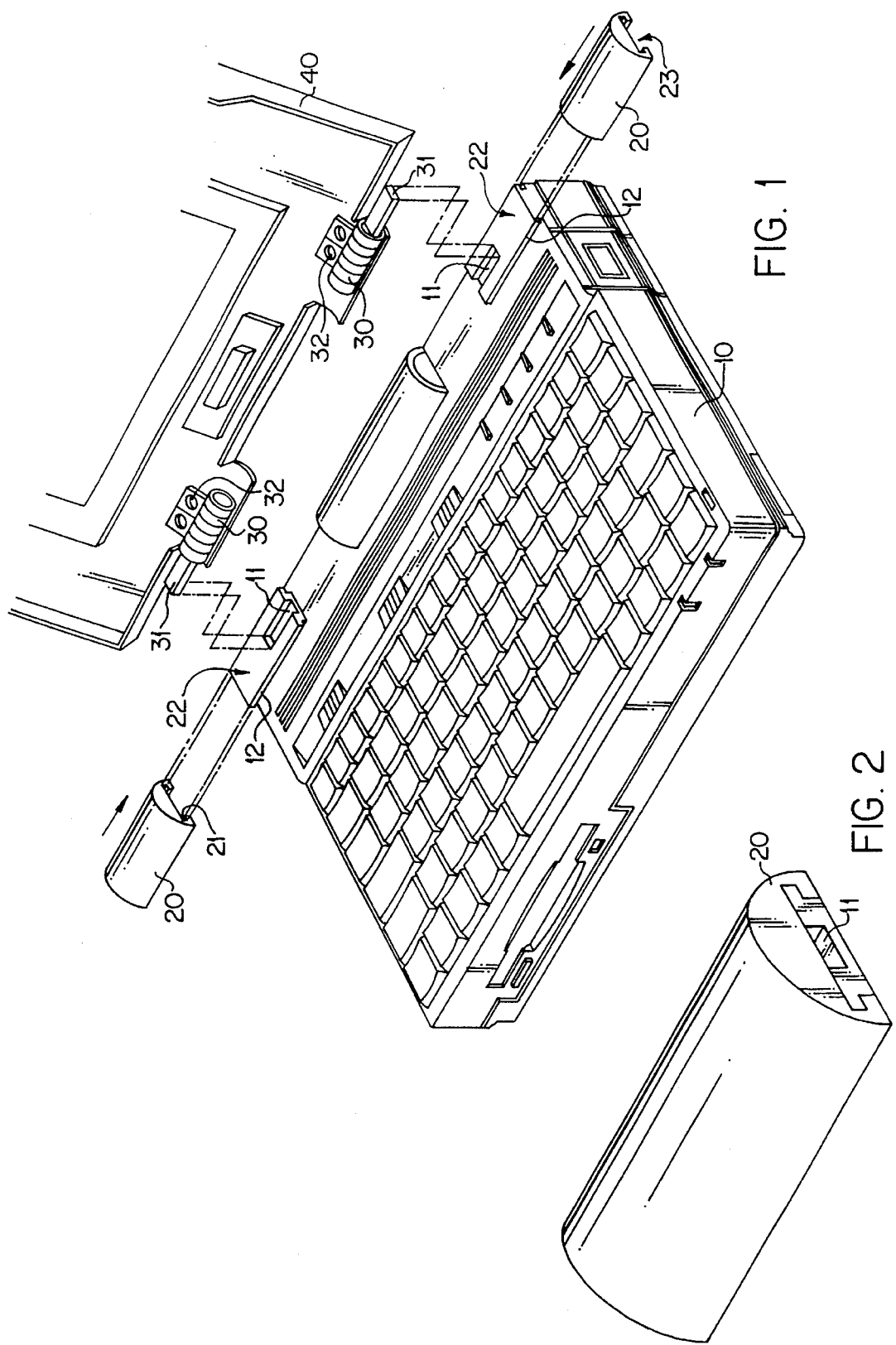

HINGE SECUREMENT DEVICE FOR A PORTABLE COMPUTER

BACKGROUND OF THE INVENTION

The present invention relates generally to hinge securement devices, and, more particularly, to a hinge securement device which is especially useful for hingedly coupling the liquid crystal display support of a portable computer to the main body thereof.

In general, compact and lightweight notebook and laptop computers have become increasingly popular due to their portability. Such portable computers generally have a liquid crystal display (LCD) mounted on a support member which is hingedly attached to the main body of the computer. Typically, the hinges each have a first hinge plate which is fixably attached, e.g., by screws, to the LCD support member, and a second hinge plate which is fixably attached, e.g., by screws, to the main body of the computer. However, this conventional hinge securement device suffers from at least the following major drawbacks. Namely, the conventional hinge securement device increases the difficulty and complexity of the computer assembly process, and also renders disassembly (e.g., for repairs) more difficult and less convenient for the user.

In an effort to overcome the above-described major drawbacks of the conventional hinge securement device, the present applicant has disclosed a removable hinge securement device in Korean Utility Model Application No. 93-3115, which was filed in Korea on Mar. 4, 1993. The removable hinge securement device disclosed in the above-identified Korean Utility Model Application includes a sliding door provided in the main body of the computer, with the second hinge plate being inserted within a recess which is covered by the sliding door. While this invention constitutes a significant improvement over the above-described conventional hinge securement. device, in that it facilitates easy disassembly, it does not facilitate the desired ease of assembly.

Based on the above, there presently exists a need in the art for a removable hinge securement device which more fully overcomes the drawbacks and shortcomings of the conventional hinge securement devices.

SUMMARY OF THE INVENTION

The present invention, in a preferred embodiment thereof, encompasses a hinge securement device for hingably securing the LCD support member and the main body of a portable computer, which includes a pair of hinges provided adjacent to opposite sides of a lower, front portion of an LCD support member, a pair of flat bars provided on respective ones of the hinges and extending outwardly therefrom, a pair of rails provided adjacent to opposite corners of the main body, each of the rails being provided with a slot or notch formed therein. The flat bars are preferably snap-fit into respective ones of the notches, to thereby couple the hinges to the main body. A pair of cap members are slidably secured to respective ones of the rails in at least partially covering relationship to the respective flat bars, to thereby secure the hinges to the main body of the portable computer.

BRIEF DESCRIPTION OF THE DRAWINGS

These and various other features and advantages of the present invention will be readily understood with reference to the following detailed description taken in conjunction with the accompanying drawing, wherein like reference numerals designate like structural elements, and, in which:

FIG. 1 is a perspective view of a portable computer with an exploded view of the hinge securement device of the present invention; and, FIG. 2 is an isolated, perspective view of a portion of the hinge securement device of the present invention depicted in FIG. 1.

DETAILED DESCRIPTION OF THE INVENTION

With reference now to FIG. 1, the hinge securement device of a preferred embodiment of the present invention will now be described. More particularly, the hinge securement device of the preferred embodiment of the present invention includes a pair of spaced-apart hinges 30 attached, e.g., by means of screws 32, to a lower, front portion of an LCD support member 40 of a portable computer. The manner, location, and type of hinges 20 employed are not limiting to the present invention. In accordance with the present invention, a flat bar 31 is mounted on and extends outwardly from each hinge 30. The flat bars 31 may be mounted on their associated hinges 30 by any convenient means, e.g., the flat bars 31 may be formed as an integral part of the hinges 30, or, alternatively, may be press fit within an opening provided in the hinges 30. It should be clearly understood, however, that neither the shape nor material of which the flat bars 31 are constructed are limiting to the present invention.

With reference now to both FIGS. 1 and 2, the hinge securement device of the preferred embodiment of the present invention further includes a pair of beams or rails 22 provided on the upper surface of the main body 10 of the portable computer on opposite corners thereof. The rails 22 may be formed as an integral part of the main body 10 or may be secured thereto by any convenient means, e.g., by means of a strong adhesive. Each of the rails 22 is provided with an open-ended slot or notch 11, with the respective notches 11 preferably being disposed in opposed relationship to each other. The flat bars 31 are adapted to be inserted within corresponding ones of the notches 11, and are preferably dimensioned so as to fit snugly within the respective notches 11. Thus, the flat bars 31 can be essentially snapped into place within the respective notches 11, to thereby facilitate easy coupling/decoupling of the hinges 30 to/from the main body 10 of the portable computer, and thus, easy assembly and disassembly of the portable computer.

In order to secure the hinges 30 to the main body 10 of the portable computer, a pair of cover or cap members 20 adapted to be slidably secured to and interlockingly engage corresponding ones of the rails 22 are provided. More particularly, the cap members 20 are each provided with a channel 23 having a shape complementary to that of the respective rails 22, to thereby enable the cap members 20 to be slided on the respective rails 22 in at least partially, and, preferably, fully covering relationship to the flat bars 31 disposed within the respective notches 11 of the respective rails 22, to thereby contain or capture the flat bars 31, thus preventing accidental decoupling of the hinges 30 from the main body 10 of the portable computer. As can be seen in FIGS. 1 and 2, the channel 23 formed within each cap member 20 defines a pair of opposed, longitudinally extending grooves 21 which interlockingly engage, in a tongue-in-groove fashion, longitudinally extending flanges or tongues 12 extending outwardly from opposite sides of the corresponding rail 22. Although the cap members 20 are shown as being of semi-cylindrical shape, and the tongues 12 and grooves 21 are shown to be of rectangular shape, it should be clearly understood that the present invention is not limited to these shapes or forms. For example, the tongues 12 and grooves 21 can advantageously be dovetail-shaped to enhance the integrity of the tongue-in-groove joints formed by the interlocking engagement of the tongues 12 and grooves 21, to thereby strengthen the securement of the hinges 30 to the main body 10 of the portable computer. It should also be clearly understood that neither the type nor material of construction of the rails 22 and the cap members 20 is limiting to the present invention. For example, the rails 22 and the cap members 20 may be made of rubber, plastic, metal, or any other suitable material.

From the above and foregoing, it can be appreciated that the above-described hinge securement device of the preferred embodiment of the present invention facilitates quick, easy, and simple securement of the hinges 30 provided on the LCD support 40 to the main body 10 of the portable computer, and equally quick, easy, and simple detachment of the hinges 30 from the main body 10, thereby overcoming the limitations and disadvantages of the conventional hinge securement devices described hereinabove.

Although a presently preferred embodiment of the present invention has been described in detail hereinabove, it should be clearly understood that many variations and/or modifications which may appear to those skilled in the art will still fall within the spirit and scope of the present invention as defined in the appended claims. In this connection, although the hinge securement device of the present invention has been described in connection with its particular application to a portable computer, it should be clearly recognized that the device of the present invention can be utilized to secure any hinge of any device.

What is claimed is:

1. A hinge securement device, comprising:
   a hinge secured to a first member;
   a first securement member secured to said hinge, and extending outwardly therefrom;
   a second securement member secured to a second member, said second securement member being provided with a notch, said first securement member being disposed within said notch; and,
   a third securement member slidably secured to said second securement member in at least partially covering relationship to said second securement member.

2. The hinge securement device as set forth in claim 1, wherein said third securement member is disposed in fully covering relationship to said second securement member.

3. The hinge securement device as set forth in claim 1, wherein said first securement member comprises a flat bar.

4. The hinge securement device as set forth in claim 3, wherein said notch is open-ended.

5. The hinge securement device as set forth in claim 4, wherein said second securement member comprises a rail having longitudinally extending tongues extending outwardly from opposite sides thereof.

6. The hinge securement device as set forth in claim 5, wherein said third securement member comprises a cap member having a channel formed therein, said channel having a shape complementary to that of said rail.

7. The hinge securement device as set forth in claim 6, wherein said channel of said cap member defines a pair of longitudinally extending, opposed grooves which interlockingly engage respective ones of said tongues of said rail.

8. The hinge securement device as set forth in claim 7, wherein said tongues of said rail and said grooves of said cap member are dimensioned such as to provide a snug tongue-in-groove joint.

9. The hinge securement device as set forth in claim 8, wherein said first securement member is dimensioned so as to fit snugly within said notch.

10. The hinge securement device as set forth in claim 1, wherein said first securement member is dimensioned so as to be snap fit into said notch.

11. The hinge securement device as set forth in claim 9, wherein said cap member is of semi-cylindrical shape.

12. The hinge securement device as set forth in claim 1, wherein said first member comprises an LCD support member of a portable computer, and said second member comprises a main body portion of said portable computer.

13. The hinge securement device as set forth in claim 9, wherein said first member comprises an LCD support member of a portable computer, and said second member comprises a main body portion of said portable computer.

14. The hinge securement device as set forth in claim 9, wherein said first securement member comprises a flat bar.

15. The hinge securement device as set forth in claim 14, wherein said flat bar is an integral appendage of said hinge.

16. The hinge securement device as set forth in claim 14, wherein said flat bar is a separate component secured to said hinge.

17. A hinge securement device for a portable computer having an LCD support member and a main body, comprising:
   a pair of hinges secured to a lower, front portion of said LCD support member, adjacent opposite sides thereof;
   a pair of first securement members secured to and extending outwardly from respective ones of said hinges;
   a pair of second securement members provided adjacent opposite corners of an upper surface of said main body, each of said second securement members being provided with a notch, wherein respective ones of said first securement members are disposed within respective ones of said notches; and,
   a pair of third securement members slidably secured to respective ones of said second securement members in at least partially covering relationship to respective ones of said second securement members.

18. The hinge securement device as set forth in claim 17, wherein said third securement members are disposed in fully covering relationship to respective ones of said second securement members.

19. The hinge securement device as set forth in claim 17, wherein each of said notches is open-ended and disposed in opposed relation to the other one of said notches.

20. The hinge securement device as set forth in claim 19, wherein each of said second securement members comprises a rail having longitudinally extending tongues extending outwardly from opposite sides thereof.

21. The hinge securement device as set forth in claim 20, wherein each of said third securement members comprises a cap member having a channel formed therein, said channel having a shape complementary to that of a respective one of said rails.

22. The hinge securement device as set forth in claim 21, wherein said channel of each said cap member defines a pair of longitudinally extending, opposed grooves which interlockingly engage respective ones of said tongues of a respective one of said rails.

23. The hinge securement device as set forth in claim 22, wherein said tongues of each said rail and said grooves of each said respective one of said cap members are dimensioned such as to provide a snug tongue-in-groove joint.

24. The hinge securement device as set forth in claim 23, wherein each of said first securement members is dimensioned so as to fit snugly within said respective one of said notches.

25. The hinge securement device as set forth in claim 24, wherein each of said first securement members comprises a flat bar.

26. The hinge securement device as set forth in claim 25, wherein each of said flat bars comprises an integral appendage of said respective one of said hinges.

27. The hinge securement device as set forth in claim 25, wherein each of said flat bars is a separate component secured to said respective one of said hinges.

* * * * *